Sept. 4, 1923.

J. G. DORWARD

ROTARY POWER HEAD

Filed June 14, 1922 3 Sheets-Sheet 1

1,467,145

Inventor
JOHN G. DORWARD.
By Dewey, Strong, Townsend and Loftus
Attys

Sept. 4, 1923.

J. G. DORWARD 1,467,145

ROTARY POWER HEAD

Filed June 14, 1922  3 Sheets-Sheet 3

Inventor
JOHN G. DORWARD.
By Dewey, Strong, Townsend and Loftus
Attys

Patented Sept. 4, 1923.

1,467,145

UNITED STATES PATENT OFFICE.

JOHN G. DORWARD, OF SAN FRANCISCO, CALIFORNIA.

ROTARY POWER HEAD.

Application filed June 14, 1922. Serial No. 568,149.

*To all whom it may concern:*

Be it known that I, JOHN G. DORWARD, a citizen of the United States, residing in the city and county of San Francisco, and State of California, have invented new and useful Improvements in Rotary Power Heads, of which the following is a specification.

This invention relates to power heads such as are employed in conjunction with deep well reciprocating plunger pumps and the like, and especially to that type in which rectilinear movement is obtained by a double set of cranks cooperating with an internal planetary gear set.

Many attempts have been made in recent years to improve power heads for operating deep well pumps of the reciprocating plunger type. The old method of employing a crank shaft, a connecting rod and cross head, although objectionable for many reasons, still remains in common practice. The crank type mentioned usually necessitates a structure of excessive height and weight where the center of gravity is high and similarly the main operating gear or pulley by which the power head is driven. This, in conjunction with the angularity assumed by the connecting rod and the friction produced by the cross head on the slide bars, causes the whole structure to become unstable and the power head to weave and twist when the operating head or load is applied. To overcome this weakness the individual parts are designed extra heavy and taken as a whole produces a structure which is high, massive and heavy, and costly to manufacture. The principal objection to the crank type of power head is therefore excessive height and weight, lack of rigidity, and high cost of manufacture.

With the stated objections in view many manufacturers have attempted to overcome these faults and the most feasible way seems to be the elimination of the connecting rod and by mechanical means produce what is commonly known as a straight line power head. The elimination of the connecting rod tends to produce stability as more than one-half the height is saved by such methods, and considerable friction is removed by elimination of a cross head. Such manufacturers have been successful in producing certain ingenious devices which produce a straight line effect, but few have achieved substantiality with their devices, nor have they been able to reduce the high cost of manufacture. Many attempts have been made to employ the old-time method of producing a parallel motion of a piston rod, by direct connection with a spur gear rotating upon the wrist pin of a crank shaft, and by placing a gear on the crank pin which intermeshes with the fixed internal gear of double its diameter. In this type of structure a crank pin is attached to the side of the rotating gear which turns on the crank pin of the main crank shaft, thus producing a double crank effect, one crank pin operating on the crank pin of the other crank. The deficiency of this device is due to the double overhang of the two crank pins and eliminates this device where heavy duty work is encountered. Further when employing the same for the operation of a deep well pump, where the push and pull effect is severe, the twisting effect on the crank pins when the plunger is midway on either the up or down stroke is enormous and the strains and friction added at this particular point cause a structure of this type to rack itself to pieces.

The object of the present invention is to generally improve and simplify power heads which employ a double crank motion cooperating with an internal planetary gear set; to provide a structure of this character in which the double overhang of the cranks is entirely eliminated; to provide a power head which is rigid, substantial and low in stature, bringing the center of gravity as close to the base as possible, and further to provide a structure in which large and liberal bearing areas may be obtained and lubrication readily taken care of. Other objects will hereinafter appear.

One form which my invention may assume is exemplified in the following description and illustrated in the accompanying drawings, in which—

Figure 1:
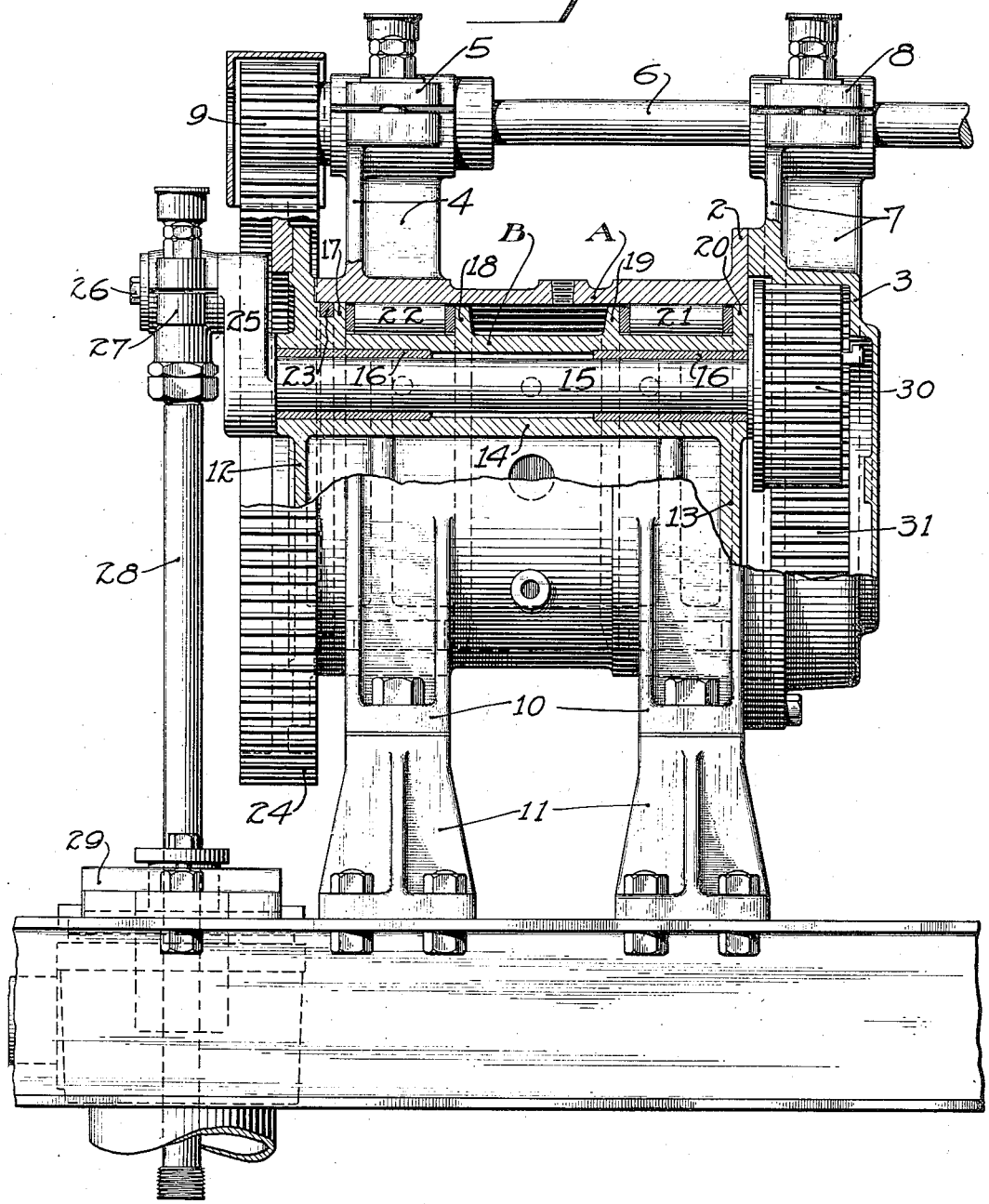
Fig. 1 is a side elevation of the power head partially broken away and partially in section.
Figure 2:
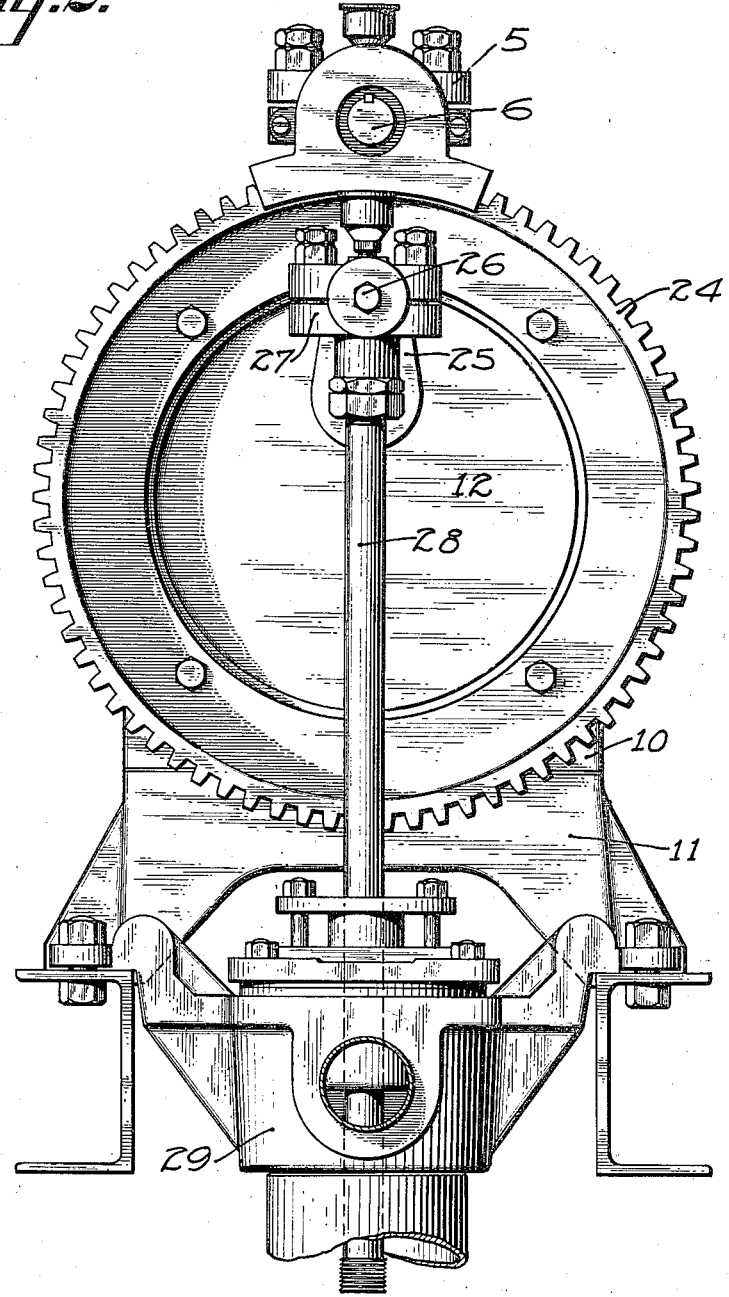
Fig. 2 is an end view of the power head.

Referring to the drawings in detail, and particularly to Fig. 1, A indicates the main frame, hereinafter to be termed the rotor housing. This frame is cylindrical in cross section and elongated as shown. One end of the housing is provided with an annular flange 2, to which is secured a head member 3. The opposite end of the housing is ribbed, as at 4, and these ribs rise and converge at a point above the housing to form a bearing 5, in which is journalled a driving shaft 6. The head member 3 is similarly ribbed, as at 7, and terminates in a bearing 8, which aligns with the bearing 5; these bearings being provided for the purpose of supporting the driving shaft 6, in the front end of which is secured a spur pinion 9. The lower side of the rotor housing is also ribbed and these ribs terminate in foot brackets 10 by which the housing may be suitably supported on cross frame members 11, as illustrated.

The rotor housing A is hollow and is machined to a true bore and faced on the front and rear end to form thrust surfaces. The foot brackets 10, as previously stated, are bolted to the cross members 11, and these are in turn bolted to a pair of steel channel irons which serve the function of a base. This general arrangement produces a sturdy, compact, low down frame for the power head, the further structure and operation of which will hereinafter appear.

Adapted to be received by the cylindrical bore of the rotor housing A is a rotor B, which will hereinafter be termed the crank shaft rotor. This rotor is hollow and cylindrical in shape and is provided with solid end flanges 12 and 13, which seal up the respective ends of the rotor. The rotor is cored out or hollow as shown, but sufficient metal remains in one side thereof to produce a bearing 14 for a crank shaft 15. The shaft extends entirely through the rotor as shown in Fig. 1 and bushings are disposed at each end thereof as at 16 to form bearings therefor. The space between the bushings is used as an oil well and crossways through the center of the crank shaft bearing admits oil from the interior of the crank shaft rotor. One or more holes are similarly cored or drilled through the shell of the crank shaft rotor to admit oil from the interior of the rotor housing, thus permitting ready lubrication of the rotating parts.

Formed exterior of the crank shaft rotor, or cast integral therewith, is a series of annular ribs 17, 18, 19 and 20, and formed between the same are annular grooves which are machined to receive annular roller bearings as indicated at 21 and 22. These rollers are constructed in any suitable manner and may be interspaced by cages of suitable construction. In fact the cages may be formed of segments, if desired, thus permitting ready insertion or removal whenever required.

Formed between the flange 12 on the front end of the rotor B and the first annular flange 17 is a small annular groove 23, which is provided for the reception of an oil sealing ring. This ring is machined to fit the groove and is finished larger in diameter than the inside bore of the main housing A. The ring is then cut and lap jointed and compressed into the groove when the crank shaft rotor is inserted, and as such forms an oil seal which will prevent escape of lubricant from the main housing A.

To secure the rotor against endwise movement when placed within the housing A, a plurality of bronze thrust plates is employed. These plates engage the end flange 2 and thus secure the rotor against endwise removal. Suitably secured to the front flange 12 of the rotor is a ring gear 24. This gear meshes with the driving pinion 9 and forms the main driving gear in as much as it transmits turning movement to the rotor B and the crank shaft journalled therein. Secured on one end of the crank shaft is a crank 25 and a pin 26, and directly coupled thereto, as at 27, is a plunger rod 28 which is extended downwardly into the well, the head of which is indicated at 29. Secured on the opposite end of the crank shaft is a spur gear 30, and intermeshing therewith is an internal gear 31, this internal gear being formed as an integral part of the head member 3. The ratio of the gears 30 and 31 is two to one, and the general operation of the device will be as follows:

With power transmitted to shaft 6 in any suitable manner, a turning movement will be transmitted to the gear 24 through the driving pinion 9, and turning movement will simultaneously be transmitted to the rotor B and the crank shaft journalled therein. This crank shaft is eccentrically positioned with relation to the center longitudinal axis of the housing A and the rotor B, and will for this reason serve the function of a crank shaft. It will simultaneously rotate in a direction reverse to that of the rotor B as constant mesh is maintained between the gears 30 and 31, the crank shaft proper turning two revolutions to one of the rotor B. The movement produced by the crank pin 26 will be a rectilinear movement and this movement can be readily traced by referring to Fig. 3. In this view it must be assumed that the rotor B turns in the direction of arrow a and that the internal gear 31 remains stationary. Therefore, as rotor B turns in the direction of arrow a, the main axle of the crank shaft, indicated at 15, will travel in a true circle as indicated by the dotted lines 35. The crank will at the same time rotate about its longitudinal axis due to the meshing of the gears 30 and 31 and will complete a one-half revolution about its axis when the rotor B has made a one-half revolution, the crank shaft rotating in the direction of arrow b or directly opposite to the direction of rotation of the main rotor. The crank indicated at 25 assumes a vertical position when the plunger rod reaches the upper end of its stroke with the crank pointing up, and it similarly assumes a vertical position at the lower end of the plunger stroke, as indicated by dotted lines at 36 with the crank pointing down. When one-fourth of a revolution has been completed, a horizontal position is assumed, as indicated by dotted lines at 37, and forty-five degree angular positions are assumed at the intermediate positions indicated by dotted lines at 38 and 39. From this diagram it can be seen that the crank pin 26 travels in a perfect vertical line; further that the stroke is compounded as added to the complete stroke of the crank 25 is also the stroke produced by the shaft proper when travelling around the circle indicated at 35, that is the radius of this circle is equal to the radius of the crank and a compounded or double stroke is thus obtained.

When comparing the present structure with the structures referred to earlier in the specification, it might be stated that a single crank and an eccentric are employed as a substitute for a double or a compound crank, that is the rotor B in reality serves the function of an eccentric as the crank shaft 15 is eccentrically journalled therein. This is perhaps one of the most important features of the present invention as it provides a long, large and liberal bearing and support for the shaft 15, and similarly permits the formation of large and liberal bearing areas for the rotor B. It also permits the use of a single crank, as indicated at 25, and to this extent reduces the overhang usually encountered in this type of power head to one-half.

A further important feature obtained by this structure is the balancing of the gears, that is the main driving gears are disposed at one end of the rotor and the crank shaft rotating gears at the opposite end thereof, thus distributing the pressures substantially equal to the opposite ends of the rotor, and not on one end thereof as would be the case where the old type of power head is employed.

By employing the sealing ring 23, it is obvious that the entire housing B may be filled with grease or a heavy lubricating oil, and similarly the head 3 as this completely encloses the internal gear 31 and the gear 30. This lubricant will be retained by the sealing ring 23 and as the rotor has openings formed therein communicating with the crank shaft bearings, and also with the interior of the casing A, it is obvious that all parts will be automatically lubricated, and that lubrication will only be required at great intervals.

Figure 3:
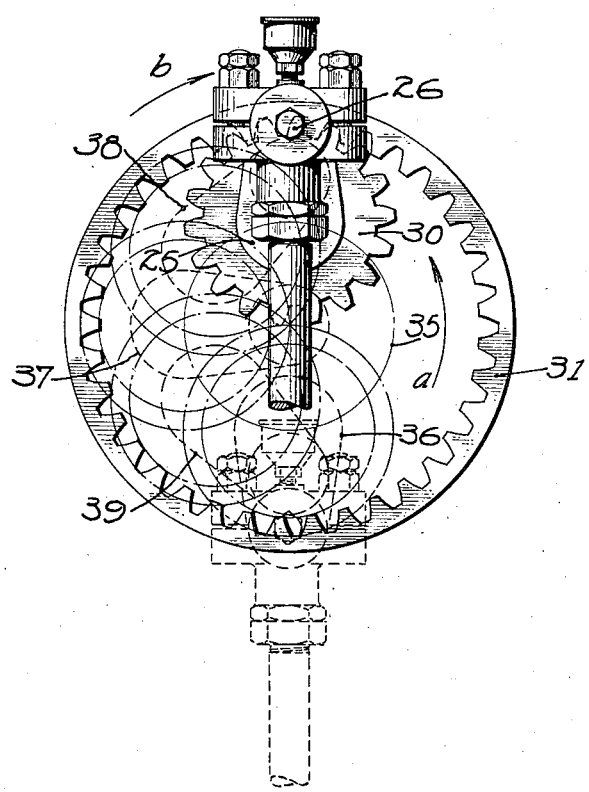
Fig. 3 is a diagrammatic view showing the different positions assumed by the single crank employed during one-half of a revolution.

In the present instance I have illustrated the power head as connected with the plunger rod of a reciprocating deep well pump. I however wish it understood that it may be used for any other purpose desired, for instance in connection with compressor units, horizontal force pumps and in other installations. This statement is made in view of the fact that the rectilinear movement transmitted to the crank pin 26 may be adjusted to travel vertically as illustrated in Fig. 3, horizontally or on any angle desired. This is brought about by placing the crank pin in line with the main shaft and in line with the common line radiating from the center of the crank shaft rotor. By so aligning the pin, crank and rotor, a rectilinear motion can be transmitted either vertically, horizontally or at any degree between a vertical and horizontal position as may be desired. This is accomplished by removing the head or internal gear cover, then placing the crank pin in any position as stated and finally replacing and securing the internal gear so that it meshes with the gear or pinion secured on the crank shaft. Thus if the crank pin is placed to travel in a horizontal line, it is obvious that it may be connected with a compressor unit, a horizontal force pump or any other mechanism desired. I similarly wish it understood that various changes in form and proportion may be resorted to within the scope of the appended claims, and that the materials and finish of the several parts employed may be such as the experience and judgment of the manufacturer may dictate or various uses may demand.

Having thus described my invention, what I claim and desire to secure by Letters Patent is—

1. A device for transmitting rotary to rectilinear motion comprising a bearing member, an elongated cylindrical shaped rotor journalled therein, a shaft extending longitudinally through and journalled in said rotor and eccentrically positioned therein, a crank on one end of the shaft, means for rotating the rotor in one direction, and means for rotating the shaft in the opposite direction one revolution during each revolution of the rotor.

2. In a device of the character described an elongated cylindrical shaped rotor, a journal member supporting and enclosing the same, a shaft extending longitudinally through the rotor and journalled therein, said shaft being eccentrically positioned with relation to the center of the rotor, a crank arm secured on the shaft, means for rotating the rotor, and means for rotating the shaft in a direction opposite to the rotor one revolution during each revolution of the rotor.

3. A device of the character described comprising an elongated, cylindrical shaped rotor housing, an elongated, cylindrical shaped rotor journalled therein, a shaft extending longitudinally through the rotor eccentrically positioned in the rotor with relation to the longitudinal axis of the rotor and adapted to rotate in the rotor, a gear fixed on one end of said shaft, a crank member on the opposite end of the shaft, a gear secured on one end of the rotor, means for transmitting rotary motion thereto, and a stationary internal gear disposed at the opposite end of the rotor, said internal gear meshing with the gear on the shaft, and the ratio of said gears being two to one to cause the shaft to rotate one revolution in a reverse direction to that of the rotor when it is turned one revolution.

4. In a power head of the character described an elongated, cylindrical shaped rotor housing, an elongated cylindrical shaped rotor concentrically positioned within the housing, anti-friction bearings interposed between the rotor and the housing, a shaft extending through the rotor and journalled therein and eccentrically positioned with relation to the central longitudinal axis of the rotor, a head member fixed to one end of the rotor housing, an internal gear within said head member, a gear secured on the shaft intermeshing with said internal gear, a crank member secured on the opposite end of the shaft, and means for transmitting a rotary movement to the rotor.

5. In a power head of the character described an elongated, cylindrical shaped rotor housing, an elongated cylindrical shaped rotor concentrically positioned within the housing, anti-friction bearings interposed between the rotor and the housing, a shaft extending through the rotor and journalled therein and eccentrically positioned with relation to the central longitudinal axis of the rotor, a head member fixed to one end of the rotor housing, an internal gear within said head member, a gear secured on the shaft intermeshing with said internal gear, a crank member secured on the opposite end of the shaft, an annular flange formed on the opposite end of the rotor, a ring gear secured thereto, and a driving shaft having a pinion thereon intermeshing with said gear.

6. In a power head of the character described an elongated, cylindrical shaped rotor housing, an elongated, cylindrical shaped rotor concentrically positioned within the housing, anti-friction bearings interposed between the rotor and the housing, a shaft extending through the rotor and journalled therein and eccentrically positioned with relation to the central longitudinal axis of the rotor, a head member fixed to one end of the rotor housing, an internal gear within said head member, a gear secured on the shaft intermeshing with said internal gear, a crank member secured on the opposite end of the shaft, means for transmitting a rotary movement to the rotor, and an oil sealing ring interposed between one end of the rotor and the rotor housing.

7. A power head of the character described comprising a hollow, cylindrical, elongated rotor housing, an elongated, cylindrical rotor journalled therein and concentrically positioned with relation thereto, anti-friction bearing members interposed between the rotor and the housing, annular flanges formed on the exterior of the rotor for the reception of said anti-friction bearing members, a head member on one end of the housing enclosing the rotor, an oil sealing ring interposed between the rotor and the opposite end of the housing, a gear secured to this end of the rotor, a shaft extending through the rotor in parallelism with a central longitudinal axis formed through the rotor and eccentrically positioned with relation thereto, a crank member secured on one end of the shaft, a gear secured on the opposite end of the shaft, and a stationary internal gear intermeshing therewith, said last named gears having a ratio of two to one.

JOHN G. DORWARD.